(12) United States Patent
Arbour

(10) Patent No.: US 10,179,626 B2
(45) Date of Patent: Jan. 15, 2019

(54) ELECTRIC BICYCLE HAVING INTEGRATED BATTERY COMPARTMENT

(71) Applicant: TECHNOLOGIES BEWEGEN INC., Saint-Georges (CA)

(72) Inventor: Dominic Arbour, Montréal (CA)

(73) Assignee: TECHNOLOGIES BEWEGAN INC., Saint-Georges (CA)

( * ) Notice: Subject to any disclaimer, the term of this patent is extended or adjusted under 35 U.S.C. 154(b) by 0 days.

(21) Appl. No.: 14/969,763

(22) Filed: Dec. 15, 2015

(65) Prior Publication Data

US 2016/0167736 A1   Jun. 16, 2016

Related U.S. Application Data

(60) Provisional application No. 62/092,071, filed on Dec. 15, 2014.

(51) Int. Cl.
*B62M 6/90* (2010.01)
*B62K 19/30* (2006.01)

(52) U.S. Cl.
CPC .............. *B62M 6/90* (2013.01); *B62K 19/30* (2013.01)

(58) Field of Classification Search
CPC ................................ B62M 6/90; B62K 19/30
USPC ......................................................... 180/220
See application file for complete search history.

(56) References Cited

U.S. PATENT DOCUMENTS

| 5,841,351 A | 11/1998 | Rey |
|---|---|---|
| 5,917,407 A | 6/1999 | Squire et al. |
| 7,471,191 B2 | 12/2008 | Le Gars |
| D593,006 S | 5/2009 | Dallaire |
| D594,787 S | 6/2009 | Dallaire |
| D595,618 S | 7/2009 | Dallaire |
| D595,646 S | 7/2009 | Dallaire |
| D597,896 S | 8/2009 | Dallaire |
| D600,201 S | 9/2009 | Dallaire |
| D626,493 S | 11/2010 | Dallaire |
| D634,249 S | 3/2011 | Dallaire |
| 8,061,499 B2 | 11/2011 | Dallaire et al. |
| 8,272,491 B2 | 9/2012 | Khairallah et al. |
| D668,216 S | 10/2012 | Dallaire |

(Continued)

FOREIGN PATENT DOCUMENTS

| CN | 202449164 | 9/2012 |
|---|---|---|
| EP | 2230164 | 9/2010 |

(Continued)

*Primary Examiner* — Joseph M Rocca
*Assistant Examiner* — Felicia L. Brittman
(74) *Attorney, Agent, or Firm* — Norton Ruse Fulbright Canada LLP

(57) ABSTRACT

The electric bicycle described includes a fork assembly, a seat post, and a main frame including one or more structural members forming the main frame and includes a tube that is at least partially hollow and has an internal battery compartment integrally formed therein. The internal battery compartment adapted to receive a battery therein to power an electric motor of the bicycle. A distal end of the tube has an opening formed therein which communicates with the internal battery compartment. The battery is insertable into the internal battery compartment through the opening. The battery is securable in the internal battery compartment within the tube by at least one of the seat post and an extremity of the fork assembly.

15 Claims, 3 Drawing Sheets

(56) References Cited

U.S. PATENT DOCUMENTS

| | | | |
|---|---|---|---|
| D673,902 S | 1/2013 | Dallaire | |
| 8,438,946 B2 | 5/2013 | Giroux | |
| 8,448,971 B2 | 5/2013 | Giroux | |
| 8,517,162 B2 | 8/2013 | Dallaire et al. | |
| 8,536,993 B2 | 9/2013 | Ayotte et al. | |
| 2003/0034873 A1 | 2/2003 | Chase et al. | |
| 2007/0239465 A1 | 10/2007 | Le Gars | |
| 2010/0228405 A1 | 9/2010 | Morgal et al. | |
| 2011/0115193 A1 | 5/2011 | Giroux | |
| 2011/0121538 A1 | 5/2011 | Giroux | |
| 2012/0049483 A1* | 3/2012 | Dodman | B62M 6/55 280/281.1 |
| 2013/0255336 A1 | 10/2013 | Desai et al. | |

FOREIGN PATENT DOCUMENTS

| | | |
|---|---|---|
| FR | 2764261 | 12/1998 |
| WO | 2012123455 | 9/2012 |

* cited by examiner

(12)  US 10,179,626 B2

ELECTRIC BICYCLE HAVING INTEGRATED BATTERY COMPARTMENT

CROSS-REFERENCE TO RELATED APPLICATIONS

This application claims priority to U.S. patent application No. 62/092,071 filed Dec. 15, 2014, the entire contents of which is incorporated by reference herein.

TECHNICAL FIELD

The application relates generally to bicycles, and more particularly to battery-driven and/or battery-assisted electric bicycles.

BACKGROUND OF THE ART

Electric batteries are constantly evolving to deliver more power per unit of battery weight. Nevertheless, for certain applications, batteries still present a significant weight issue which must be accounted for in the design of the vehicle using such a battery. This is particularly true for bicycles.

Furthermore, the integration of batteries within existing vehicle structures can be challenging. In the case of electric bicycles, batteries are often mounted to bicycle frames such that the batteries are exposed and easily accessible, which makes them a target for theft or vandalism.

SUMMARY OF THE INVENTION

In one aspect, there is provided an electric bicycle including a fork assembly and a seat post, the electric bicycle comprising: a main frame including one or more structural members forming the main frame, at least one of said structural members including a tube that is at least partially hollow and having an internal battery compartment integrally formed therein and enclosed by one or more outer walls of the tube, the internal battery compartment adapted to receive a battery therein to power an electric motor of the electric bicycle, a distal end of the tube having an opening formed in said one or more outer walls, the opening communicating with the internal battery compartment wherein the battery is insertable into the internal battery compartment through the opening, the battery being securable in the internal battery compartment within the tube by at least one of the seat post and an extremity of the fork assembly.

There is also provided an electric bicycle including an electric motor, a battery, a fork assembly and a seat post, the electric bicycle comprising a main frame including one or more structural members forming the main frame, at least one of said structural members including a tube that is at least partially hollow and having an internal battery compartment integrally formed therein and enclosed by one or more outer walls of the tube, the internal battery compartment containing a battery therein to power the electric motor of the electric bicycle, a distal end of the tube having an opening formed in said one or more outer walls, the opening communicating with the internal battery compartment wherein the battery is inserted into the internal battery compartment through the opening, the battery being secured in the internal battery compartment within the tube by at least one of the seat post and an extremity of the fork assembly.

In another aspect, there is further provided a method for securing a battery within a frame of an electric bicycle, comprising: inserting the battery within at least one of a down tube and a seat tube of the frame through an opening in said tube, and positioning the battery in an internal battery compartment within said tube; and blocking the opening of said tube with a member of the electric bicycle which obstructs the opening when the bicycle is in use and prevents removal of the battery from the internal batter compartment.

BRIEF DESCRIPTION OF THE DRAWINGS

Reference is now made to the accompanying figures in which.

DETAILED DESCRIPTION

Figure 1:
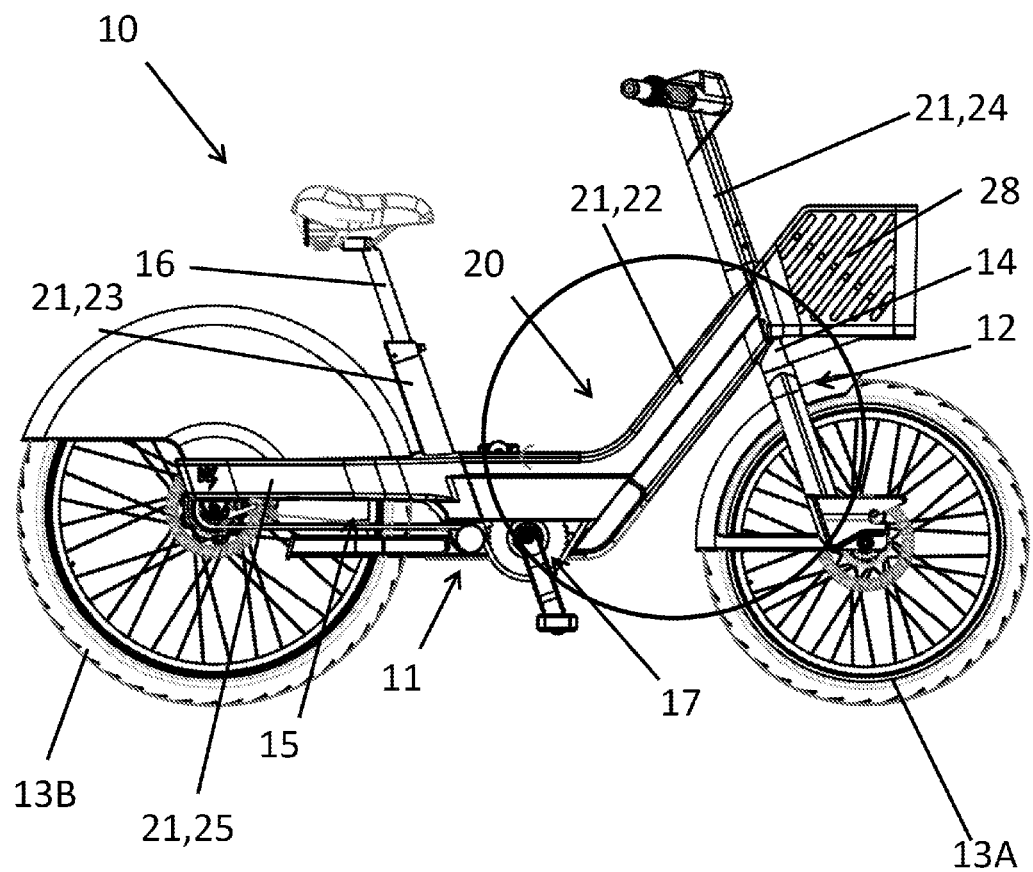
FIG. 1 is a side view of an electric bicycle, according to an embodiment of the present disclosure.

FIG. 1 illustrates an electric bicycle 10 that is partially or fully powered by an electric motor 11. The electric motor 11 outputs an electric drive which can be mechanically connected to a drive train 17 and/or transmission 15 of the electric bicycle 10 (or simply "bicycle 10"), thereby helping a user of the bicycle 10 to move the bicycle 10 in a forward direction. The motor 11 can thus complement the pedaling actuation provided by the user, or replace it entirely. The bicycle 10 has any one of a number of features which are required to make it operational, or which are particularly suited for a given application. For example, the bicycle 10 of FIG. 1 has a front wheel 13A, a rear wheel 13B, a fork assembly 12 for a front wheel with a fork stem 14, and a seat post 16. These features cooperate with a main frame 20 of the bicycle 10. Other features for the bicycle 10 are also within the scope of the present disclosure and have only been omitted herein for the purposes of brevity.

The main frame 20 forms the main structural component of the bicycle 10, thereby supporting the user of the bicycle 10 and the loads generated when the bicycle 10 is being used. The main frame 20 therefore has one or more structural members 21 which form the main frame 20 and define its shape. At least one of the structural members 21 is hollow along some or all of its length. This helps to reduce the weight of the structural member 21, and thus of the main frame 20 as well. The hollow interior of the structural member 21 can also receive therein a battery, as described in greater detail below.

Non-limiting examples of structural members 21 include a down tube 22, a seat tube 23, a head tube 24, a top tube (not shown in the embodiment of FIG. 1), and a chain stay 25. The cooperative arrangement of these structural members 21 defines the shape of the main frame 20.

The shape and configuration of the main frame 20 is generally dictated by the anticipated use of the bicycle 10. For example, the embodiment of the bicycle 10 shown in FIG. 1 can be used as part of a public bicycle-sharing program. As such, the main frame 20 is formed of the down tube 22 and the seat tube 23 connected together, but does not have the top tube in order to allow the user to more easily mount the bicycle 10. A bicycle 10 having a different intended use may have a differently-shaped main frame 20, and may include a top tube, the head tube 24, and any other structural member 21 required by the main frame 20. Such a bicycle 10 is also within the scope of the present disclosure. The down tube 22 of the main frame 20 is now discussed in greater detail.

Figure 2A:
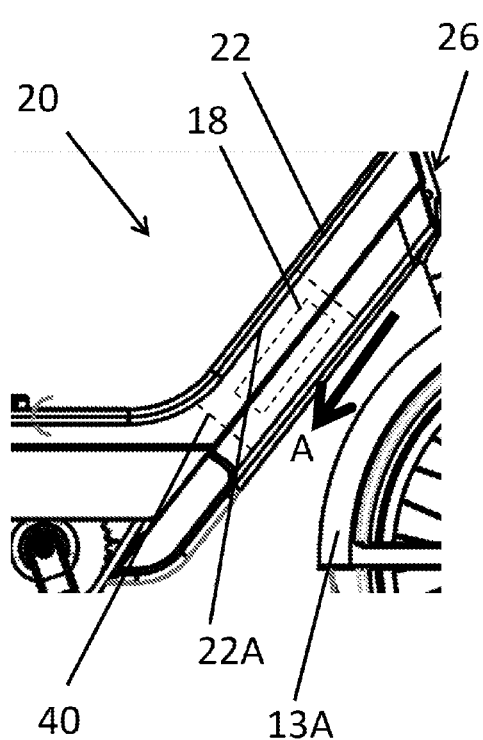
FIG. 2A is an enlarged view of the circled part of a main frame of the electric bicycle of FIG. 1.
Figure 2B:
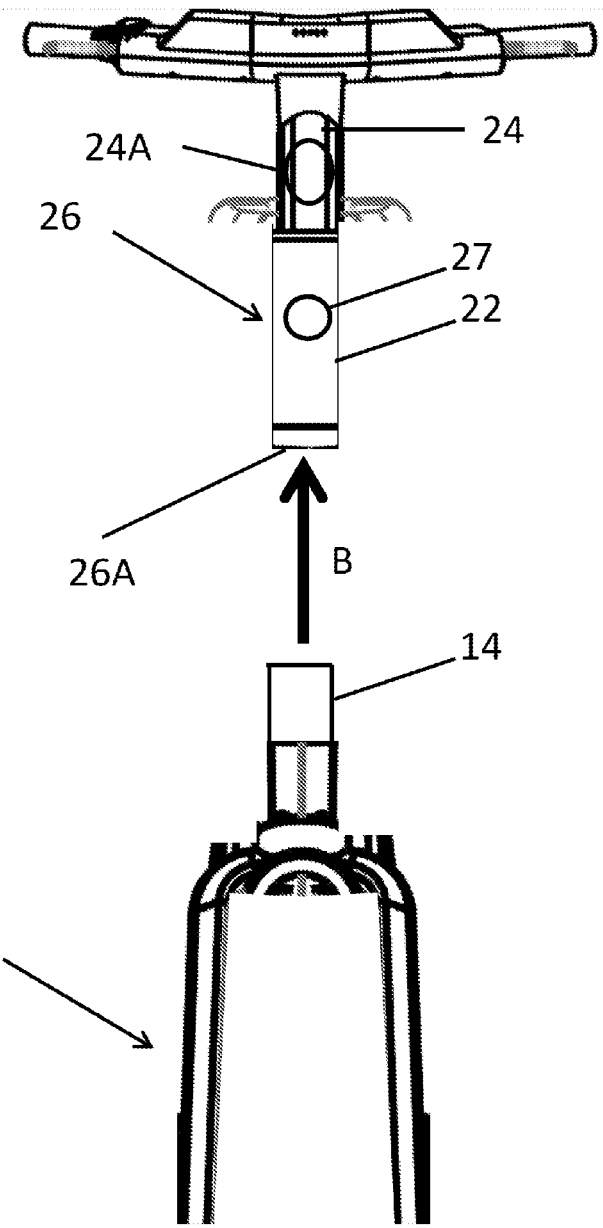
FIG. 2B is a front view of the electric bicycle of FIG. 1, the electric bicycle shown with a fork assembly separated from the main frame and without a front wheel.

Referring to FIGS. 2A and 2B, the down tube 22 is the link between the main frame 20 and the front wheel 13A. The down tube 22 can also more generally link a portion of the main frame 20, such as a bottom bracket shell, to another portion of the main frame 20, such as the head tube 24. As such, it is appreciated that the down tube 22 is not limited to the configuration shown in FIG. 2A. Nor is the down tube 22 limited to being a conventional lower tube of a three-tubed main frame 20. Instead, the down tube 22 can more generally be the lowermost tube or structural member 21 of the main frame 20 that links, directly or indirectly, to the front wheel 13A. The term "lowermost" as used herein refers to a position being closest to a ground surface on which the bicycle travels. In most instances, the lowermost structural member 21 will have a center of gravity that is closer to the ground surface than the other structural members 21. The down tube 22 can have any cross-sectional shape which remains constant or varies along its length.

In the embodiment shown, the down tube 22 is partially or completely hollow along its length, so that it can receive an electric battery 18 therein. The battery 18 can be any suitable rechargeable electrochemical power cell which provides electric power to the motor. Although the singular term "battery" is used herein, multiple batteries 18 can also be housed in the main frame 20 and are also within the scope of the present disclosure. In most instances, the battery 18 is one of the heaviest and most valuable components of the bicycle 10. As such, the battery 18 is positioned and secured within the down tube 22 so that it cannot be easily removed therefrom, and so that it does not affect the user's ability to ride the bicycle.

When it is within the down tube 22, the battery 18 is secured in place in an internal battery compartment (or simply "battery compartment") 40. The battery compartment 40 is disposed within the down tube 22 against its inner surface 22A and houses the battery 18. The battery compartment 40 also secures the battery 18 within the down tube 22 so that it cannot move relative to the down tube 22. It can thus be appreciated that the battery compartment 40 can have many different shapes and configurations commensurate with such functionality. One possible configuration of the battery compartment 40 includes a push-lock mechanism which is activated by the insertion of the battery 18 against the push-lock mechanism. When the force applied to insert the battery 18 is removed, the push-lock mechanism can lock the battery 18 in place within the battery compartment 40. Another possible configuration of the battery compartment 40 includes a fastening mechanism which extends through the down tube 22. Once the battery 18 is in position within the battery compartment 40, the fastening mechanism can be tightened from outside of the down tube 22 to secure the battery 18 in place. Other configurations of the battery compartment 40 are also within the scope of the present disclosure.

The battery compartment 40 is generally positioned toward the ground surface, and thus, towards a lower end of the main frame 20. This keeps the weight of the battery compartment 40, and the battery 18 stored therein, close to the ground surface in order to maintain a low center of gravity for the bicycle 10. The battery compartment 40 can also have suitable wiring or other electrical components in order to transmit electrical power from the battery 18 to the electric motor. The wiring can extend at least partially through the hollow interior of the down tube 22.

The battery 18 is inserted into the down tube 22 via one of its distal ends 26. More specifically, the uppermost (and forward) distal end 26 of the down tube 22, which may also comprise and/or form part of the head tube 24 of the main frame 20, has an opening 27 through which the battery 18 can be inserted. The inner surface 22A of the down tube 22 may have guide members to direct the insertion of the battery 18 into the down tube 22 and towards the batter compartment 40. In the embodiment shown, the opening 27 is an aperture in the outer surface of the distal end 26 of the down tube 22. The opening 27 may also be concealed, such as when the distal end 26 of the down tube 22 is connected to another structural member 21, such as the head tube 24. In such a configuration, the opening 27 is the hollow space at the distal end 26 of the down tube 22. The shape of the opening 27 generally corresponds to that of the battery 18, but the opening 27 can also have any other suitable shape that allows passage of the battery 18 into the down tube 22. After being inserted through the opening 27 in the distal end 26, the battery 18 travels downward through the down tube 22 along insertion direction A until it reaches the battery compartment 40, where it can be secured in place.

In order to prevent the unauthorised removal of the battery 18 from the down tube 22, the opening 27 must be blocked. The term "blocked" refers to the sealing, obstructing, or general preventing of unauthorised access to the battery 18 via the opening 27, such that accessing the battery 18 would require breaking, dismantling, or disassembling some or all of the main frame 20, thereby rending the bicycle unfit to ride. The opening 27 is so blocked with the fork assembly 12, which is attached to the distal end 26 of the down tube 22 to cover the opening 27, and thus, prevent access thereto.

The attachment of the fork assembly 12 to the distal end 26 of the down tube 22 can take different forms. In one possible configuration, the fork stem 14 of the fork assembly 12 can be inserted through an aperture 26A in the distal end 26 of the down tube 22. This is exemplified in FIG. 2B, which shows the fork stem 14 being inserted into the aperture 26B of the distal end 26 along insertion direction B. Once the fork stem 14 is fully inserted through the distal end 26, the opening 27 will be blocked. As such, anyone wishing to access the opening 27 (or the battery 18) would likely need to remove the handlebars and the fork assembly 12 of the bicycle, only to still have to retrieve the battery 18 through the relatively small opening 27. In order to ride the bicycle, the person would then also need to reassemble the handlebars and fork assembly 12. Such unauthorised access would likely prove too time-consuming, inconvenient, or difficult, and would therefore probably not be attempted.

Another possible configuration for attaching the fork assembly 12 to the distal end 26 includes securing the fork assembly 12 or fork stem 14 to a mating surface of the distal end 26 of the down tube 22 with a mechanical fastener. Anyone wishing to access the opening 27 (or the battery 18) would likely need to remove at least the fork assembly 12 of the bicycle, only to still have to retrieve the battery 18 through the relatively small opening 27, and reassemble the fork assembly 12. Such unauthorised access would likely prove too time-consuming, inconvenient, or difficult, and would therefore probably not be attempted.

Yet another possible configuration for attaching the fork assembly 12 to the distal end 26 includes providing the head tube 24 of the main frame 20 with a head tube opening 24A. The head tube opening 24A is an aperture in an outer surface of the head tube 24, and communicates with the hollow interior of the down tube 22 via the opening 27, which in this configuration is the uppermost forward hollow space of the down tube 22 that is concealed by the head tube 24 mounted to the down tube 22. The battery 18 is inserted through the head tube opening 24A and travels through the opening 27, and ultimately, into the down tube 22. Once the battery 18 is within the down tube 22, the fork stem 14 can be inserted into an aperture of the head tube 24, again along insertion direction B. Once the fork stem 14 is fully inserted through the head tube 24, the head tube opening 24A will be blocked by the body of the fork stem 14. As such, anyone wishing to access the battery 18 would likely need to remove the handlebars and the fork assembly 12 of the bicycle, only to still have to retrieve the battery 18 through the relatively small head tube opening 24A, and reassemble the handlebars and fork assembly 12. Such unauthorised access would likely prove too time-consuming, inconvenient, or difficult, and would therefore probably not be attempted.

The preceding examples of configurations for attaching the fork assembly 12 to the main frame 20, many more of which are within the scope of the present disclosure, demonstrate how the battery 18 can be secured within the down tube 22. The term "secure" in this context refers to the degree of difficulty in accessing the battery 18 without authorisation, in that such access would be sufficiently difficult and time-consuming to accomplish that it would likely not even be attempted. If so desired, the battery 18 may also be secured by mounting an accessory to add an additional layer over the opening 27, such as a basket 28 (see FIG. 1). The battery 18 can therefore be considered to be an integrated battery 18 with the main frame 20.

Figure 3A:
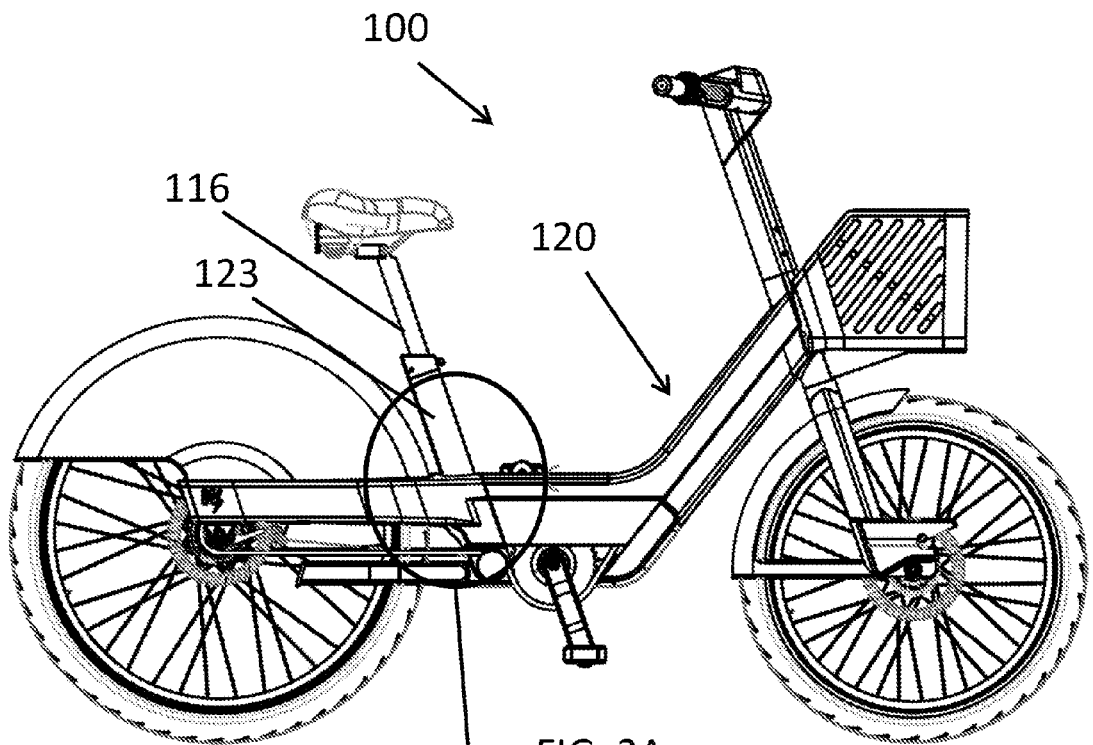
FIG. 3A is a side view of an electric bicycle, according to another embodiment of the present disclosure.
Figure 3B:
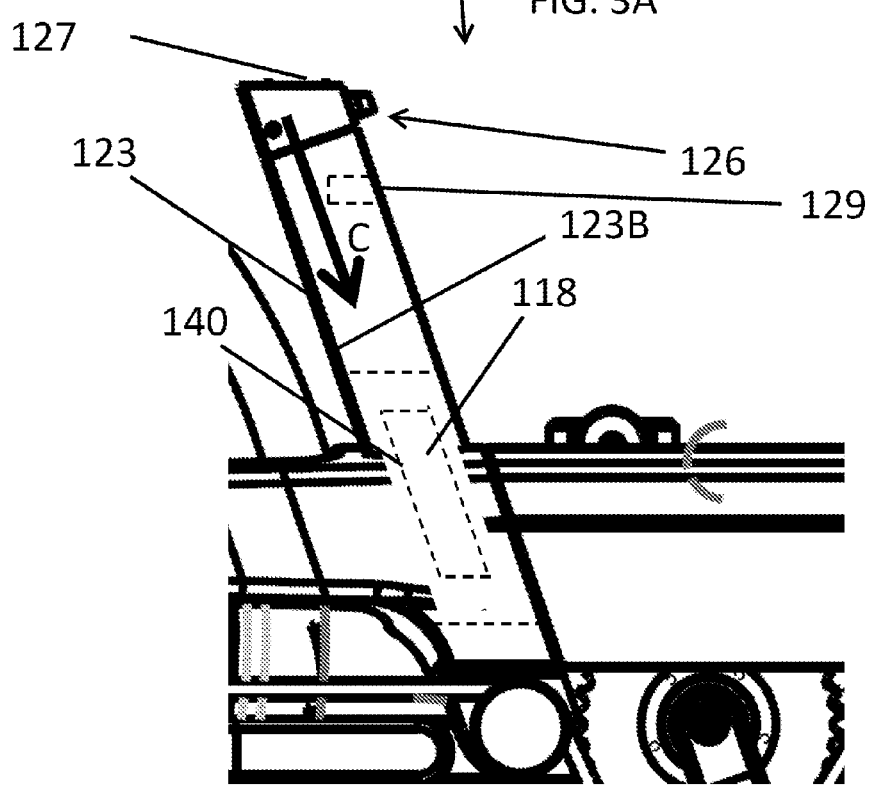
FIG. 3B is an enlarged view of the circled part of a main frame of the electric bicycle of FIG. 3A.

Referring now to FIGS. 3A and 3B, the battery 118 can also be secured in the seat tube 123. In such an embodiment, the battery compartment 140 is located within the seat tube 123 against its inner surface 123B at a lower end of the seat tube 123, thereby helping to maintain a low center of gravity for the main frame 120. Such a lower end of the seat tube 123 can be close to the bottom bracket shell, for example. At a distal, top end 126 of the seat tube 123, which is opposite to its lower end, there is an opening 127 through which the battery 118 can be inserted into the seat tube 123 along the insertion direction C. As with the opening in the down tube described above, the shape of the opening 127 generally corresponds to that of the battery 118, but the opening 127 can also have any other suitable shape. The top end 126 also has a slot 129, which is an aperture in an external side surface of the seat tube 123. The slot 129 can receive therein an extremity of a top tube (not shown) of the main frame 120.

The battery 118 can be secured within the seat tube 123 according to any one of the following non-limitative techniques. A first technique involves inserting the seat post 116 of the bicycle 100 through the opening 127 in the seat tube 123. In so doing, the body of the seat post 116 blocks the opening 127, thereby further concealing the battery 118 and preventing relatively easy access thereto. Anyone wishing to access the opening 127 (or the battery 118) would therefore need to remove the seat post 116 of the bicycle 100, only to then still have to retrieve the battery 118 through the relatively small opening 127 in the seat tube 123, and then re-insert the seat post 116 in order to be able to ride the bicycle 100. Such unauthorised access would likely prove too time-consuming, inconvenient, or difficult, and would therefore probably not be attempted.

The second technique involves inserting an extremity of the top tube of the main frame 120 through the slot 129. In so doing, the extremity of the top tube blocks the slot 129, thereby preventing easy access to the battery 118 within the seat tube 123 via the opening 127. Anyone wishing to access the battery 118 would therefore need to remove the top tube of the main frame 120, only to then still have to retrieve the battery 118 through the relatively small opening 127 in the seat tube 123. Such unauthorised access would likely prove too time-consuming, inconvenient, or difficult, and would therefore probably not be attempted.

Still referring to FIGS. 3A and 3B, a method for securing a battery 118 within the frame 120 of the bicycle 100 is also disclosed. The method includes inserting the battery 118 within one or both of the down tube and seat tube 123, via an opening 127 in the tube. The method also includes positioning the battery 118 in a battery compartment 140 within the selected tube, such as with the various mechanisms described above. The method also includes blocking the opening 127 of the tube through which the battery 118 was inserted with a member of the bicycle 100. The term "member" or "structural member" in this context refers to any component of the bicycle 100. As such, the member may be the seat post 116, the top tube, or the fork assembly and fork stem, to name just a few examples. Other members are also possible and within the scope of the present disclosure.

It can thus be appreciated that the techniques disclosed herein to secure the battery 18,118 in place and restrict or prevent access thereto facilitate the use of a relatively powerful battery 18,118. It is generally understood that powerful batteries 18,118 (i.e. those which can power a high-output motor, or last longer) are typically more expensive, and can thus make tempting targets for thieves. Such batteries 18,118 are also heavier than conventional batteries. By securing the battery 18,118 within a lower portion of the main frame 20,120 and restricting/preventing access thereto, the user of the bicycle 10,100 is able to benefit from a more powerful battery 18,118.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An electric bicycle including a fork assembly and a seat post, the electric bicycle comprising: a main frame including one or more structural members forming the main frame, at least one of said structural members including an at least partially hollow tube having an internal battery compartment integrally formed therein and enclosed by one or more outer walls of the at least partially hollow tube, the internal battery compartment adapted to receive a battery therein to power an electric motor of the electric bicycle, a distal end of the at least partially hollow tube having an opening formed in said one or more outer walls, the opening communicating with the internal battery compartment wherein the battery is insertable into the internal battery compartment through the opening, the battery being securable in the internal battery compartment within the at least partially hollow tube by an extremity of the fork assembly, wherein in an assembled and rideable position the fork assembly is connected to the main frame and the fork assembly blocks the opening, and in a disassembled and un-rideable position the fork assembly is disconnected from the main frame and the fork assembly is free of the opening to permit insertion or removal of the battery from the internal battery compartment.

2. The electric bicycle of claim 1, wherein the at least one structural member is a lowermost structural member of the electric bicycle, the lowermost structural member defining a center of gravity, the center of gravity of the lowermost structural member being closer to a ground surface than the centers of gravity of the other structural members.

3. The electric bicycle of claim 1, wherein the battery compartment and the battery received therein are disposed at a lowermost end of the at least partially hollow tube opposite to the distal end thereof.

4. The electric bicycle of claim 1, wherein the at least one structural member is a down tube of the electric bicycle.

5. The electric bicycle of claim 4, wherein the distal end of the at least partially hollow tube is an uppermost forward end of the down tube.

6. The electric bicycle of claim 5, wherein in the assembled position the extremity of the fork assembly blocks the opening in the uppermost forward end of the down tube.

7. The electric bicycle of claim 5, wherein the uppermost forward end of the down tube has an aperture therein, in the assembled position the extremity of the fork assembly within the aperture blocks the opening in the uppermost forward end of the down tube.

8. The electric bicycle of claim 5, further comprising a basket mounted adjacent to the uppermost forward end of the down tube, in the assembled position the basket blocks the opening in the uppermost forward end of the down tube.

9. The electric bicycle of claim 5, further comprising a head tube having a head tube opening therein, the head tube opening communicating with the at least partially hollow tube of the down tube via the opening in the uppermost forward end of the down tube.

10. The electric bicycle of claim 9, wherein in the assembled position the extremity of the fork assembly blocks the head tube opening.

11. The electric bicycle of claim 1, further comprising wiring extending at least partially within the at least partially hollow tube between the electric motor and the battery.

12. A method for securing a battery within a frame of an electric bicycle, comprising:
   inserting the battery within a down tube of the frame through an opening in said down tube, and positioning the battery in an internal battery compartment within said down tube;
   blocking the opening of said down tube with a fork assembly of the electric bicycle which obstructs the opening when the bicycle is assembled and in a rideable configuration, the fork assembly preventing removal of the battery from the internal battery compartment, the bicycle is assembled and in the rideable configuration by at least attaching the fork assembly to the frame; and
   when removal of the battery is necessary, unblocking the opening of the down tube by disconnecting the fork assembly from the main frame when the bicycle is disassembled and in an un-rideable configuration, thereby providing access to the internal battery compartment within said down tube for removing or inserting the battery through said opening.

13. The method of claim 12, wherein inserting the battery includes inserting the battery through the opening in an outer end of said down tube.

14. The method of claim 12, wherein blocking the opening includes inserting an extremity of the fork assembly through an uppermost forward end of said down tube, the battery being inserted within the down tube.

15. The method of claim 12, wherein blocking the opening includes closing the opening with a basket mounted to the frame of the electric bicycle.

\* \* \* \* \*